UNITED STATES PATENT OFFICE.

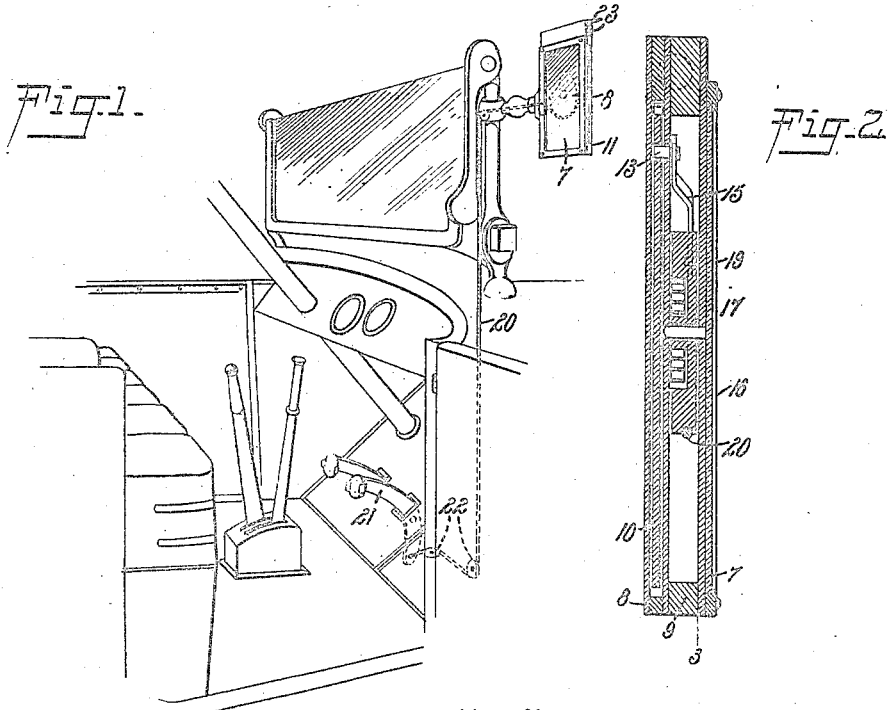
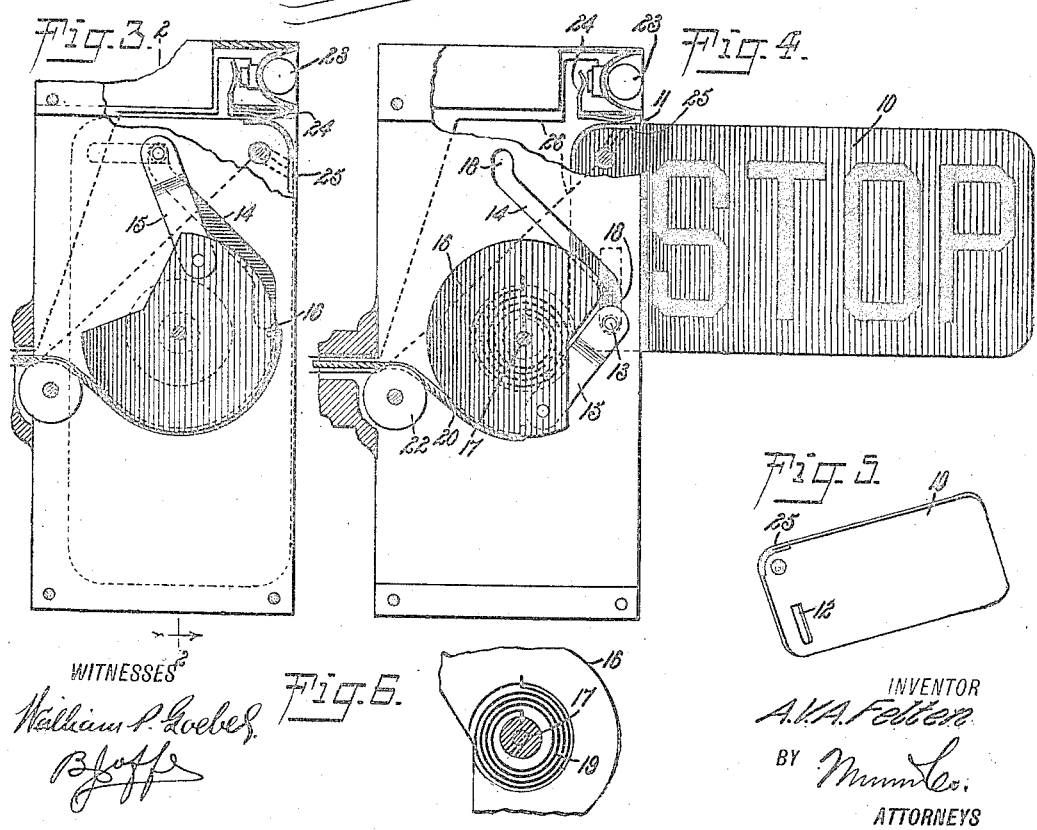

ABRAM VAN AKEN FELTEN, OF DANBURY, CONNECTICUT.

VEHICLE-SIGNAL.

1,229,922.

Specification of Letters Patent.　Patented June 12, 1917.

Application filed March 29, 1916.　Serial No. 87,485.

*To all whom it may concern:*

Be it known that I, ABRAM VAN AKEN FELTEN, a citizen of the United States, and a resident of Danbury, in the county of Fairfield and State of Connecticut, have invented a new and Improved Vehicle-Signal, of which the following is a full, clear, and exact description.

My invention relates to a vehicle signal, and an object thereof is to provide a signal which will enable the driver of a vehicle to signal to vehicles in the rear that his vehicle is going to change its course. A further object of the invention is to provide a simple and inexpensive signal combining the rearsight mirror of the driver with a semaphorelike signal housed in the mirror casing and operable by the driver to indicate that he is going to stop or change his course, and thereby prevent collision with vehicles approaching from the rear.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in all the views.

Figure 1 is a fragmentary, perspective view of a motor vehicle provided with an embodiment of my invention;
Fig. 2 is a longitudinal section through the signaling device on line 2—2, Fig. 3;

Fig. 3 is a section on line 3—3, Fig. 2;

Fig. 4 is a similar section showing the semaphorelike signal in operative position, a portion of the device being broken away to illustrate the details of construction;

Fig. 5 is a perspective view of the semaphore arm; and

Fig. 6 is a diagrammatic view of the spring for restoring the device to its normal position.

Referring to the drawings, the rear-sight mirror frame 7 has secured to the back of the frame a housing 8 spaced from the back of the mirror by transverse members 9 disposed at the upper and lower edges of the back. The housing 8 accommodates a semaphore arm 10, which is preferably rectangular in shape, with rounded corners. It is pivoted at the upper corner adjacent the open longitudinal edge 11 of the housing through which the arm is free to swing out of the housing. The arm has also a transverse slot 12 extending substantially from the adjacent corner of the arm but not reaching the pivot.

A pin 13 engaging said slot 12 also projects through a diagonal slot 14 provided in the back of the housing 8 where it is secured to one end of a link 15, which link is located between the back of the housing 8 and the back of the frame 7. The other end of the link 15 is pivotally connected to a disk 16 which journals on a stud 17 secured to the back of the housing 8. The disk 16 has a portion of its periphery cut out to accommodate the link 15 when the arm 10 is moved into operative position, as shown in Fig. 4. To prevent the arm 10 from vibrating on its pivot when in operative or in inoperative position while the vehicle is in motion the diagonal slot 14 is provided with vertical slot extensions 18, which extensions are engaged by the pin 13 when the arm is in operative or in inoperative position.

The disk 16 has a central recess on one side housing a spring 19, one end of which is secured to the disk and the other to the stud 17. A flexible member 20 connects the periphery of the disk 16 with a pedal 21, pulleys 22 being provided at suitable intervals to guide the flexible member in its movement when operated by the pedal. The spring 19 normally tends to maintain the arm 10 in inoperative position, and to retain the arm in the position shown in Fig. 4 pressure must be applied to the pedal 21. As soon as the pressure is released the spring 19 brings the arm to the position shown in Figs. 1 to 3 inclusive.

To render the signal visible at night, an incandescent lamp 23 is mounted in the housing 8. The lamp is connected to a movable contact 24 located within the housing 8. A coöperating contact 25 is carried by the arm 10, and it engages the movable contact 24 when the arm is brought into operative position as shown in Fig. 3, whereby the lamp 23 is energized if energy is supplied to the leads 26.

The rear-sight mirror indicates to the driver of the vehicle whether or not there is any traffic to the rear of his vehicle; and if there is none, he may dispense with the operation of his signal. The mirror also indicates to the driver the position of the vehicles in the rear and, consequently, allows him to judge of the efficacy of his signal.

I claim:

1. In a device of the class described, a housing having an open edge, an arm pivotally mounted in said housing to swing out from the open edge, a disk mounted to revolve in the housing, a link connected to the disk, a pin carried by said link, said housing having a diagonal slot through which said pin projects to engage the arm, means for actuating the disk whereby the arm is moved out of the housing, and resilient means associated with the disk for restoring the same to normal position whereby the arm is restored into the housing.

2. In a device of the class described, a housing, an arm pivotally mounted in said housing to swing out therefrom, a disk mounted to revolve in the housing, a link connected to the disk with one of its ends, a pin carried by the other end of the link, said housing having a diagonal slot through which said pin projects, said arm having a slot also engaged by said pin, means for revolving the disk whereby the arm is moved, and resilient means associated with the disk tending to maintain the same in a predetermined position, whereby the arm is adapted to be maintained in the housing.

3. In a device of the class described, a housing, an arm in the housing mounted to swing out therefrom, a member mounted to rotate in the housing, a link connected to said member, a pin associated with the link engaging said arm, said housing having guiding means for said pin, means for actuating said member mounted to rotate, and resilient means for restoring said arm to its normal position.

4. In a device of the class described, a housing having an open edge, an arm pivotally mounted in said housing to swing out from the opening, a revoluble disk in the housing, a link pivotally connected to the disk and engaging the arm, said housing having means for guiding the movement of the link, means for rotating the disk, and a resilient member for restoring the disk to its normal position.

In testimony whereof I have signed my name to this specification in the presence of two subscribing witnesses.

ABRAM VAN AKEN FELTEN.

Witnesses:
A. N. GRIFFING,
W. W. DAYTON.

Copies of this patent may be obtained for five cents each, by addressing the "Commissioner of Patents, Washington, D. C."